Patented Sept. 10, 1946

2,407,446

UNITED STATES PATENT OFFICE 2,407,446

UNSATURATED ESTERS OF CARBONIC ACID AND POLYMERS THEREOF

Maxwell A. Pollack, Austin, Tex., assignor to Pittsburgh Plate Glass Company, Pittsburgh, Pa., a corporation of Pennsylvania No Drawing. Application June 12, 1942, Serial No. 446,779

12 Claims. (Cl. 260—78)

This invention relates to a new group of esters of carbonic acid and unsaturated monohydroxy ethers of an unsaturated monohydroxy alcohol and a polyhydroxy alcohol such as the monohydroxy ethers thus esterified which may be of several general types, some of which are represented by the following formulas:

$$[R_1\text{—}O]_x\text{—}R_2\text{—}OH \quad (1)$$

$$R_3\text{—}[O\text{—}R_4]_y\text{—}OH \quad (2)$$

in which $R_1$ and $R_3$ are radicals derived from unsaturated alcohol preferably having 2 to 5 carbon atoms such as vinyl, allyl, methallyl, crotyl, chloroallyl, tiglyl, angelyl, chlorocrotyl, $\alpha$ or $\beta$-ethylallyl, and propargyl alcohols, methyl vinyl carbinol, ethyl vinyl carbinol, methallyl carbinol, etc. The radicals $R_1$ and $R_3$ may also be a radical of an alcohol having six to ten carbon atoms such as cinnamyl, geranyl, citronellyl, linallyl, hexenyl, isopropyl-propargyl, phenyl propargyl, etc., alcohols, diallyl carbinol, ethyl allyl carbinol, ethyl allyl carbinol, etc. Compounds of somewhat different properties may be derived from alcohols having more than ten carbon atoms in an unsaturated aliphatic chain, such as oleyl, linoleyl, etc. alcohols, or those having the unsaturation in a ring structure, such as furfuryl alcohol.

In Formula 1 $R_2$ may be any divalent aliphatic radical (i. e. $x=1$) as in allyl Cellosolve (ethylene glycol monoallyl ether), vinyl Cellosolve (ethylene glycol monovinyl ether), or the corresponding derivatives of trimethylene glycol, propylene glycol, tetramethylene glycol, etc. $R_2$ may be trivalent ($x=2$) as in glycerol diallyl ether or glycerol ethyl-allyl ether, or may be of higher valence such as monohydroxy derivatives of alpha methyl glycerol, erythritol, pentaerythritol, etc. In Formula 2 $R_4$ may be an divalent aliphatic radical. Where $y$ equals "one," the compound is identical to that of Formula 1 in which $x=1$. Where $y$ equals "two," the hydroxy compounds are the carbitols such as allyl carbitol, methallyl carbitol, etc. $x$, however, may be any small whole number. Ethers of other polyhydroxy compounds such as propylene glycol, isobutylene glycol, or polyglycols such as triethylene glycol, tetraethylene glycol, dipropylene glycol, tripropylene glycol, or mixed polyglycols formed from ethylene and propylene glycols mixtures also may be esterified as herein contemplated.

One preferred group of carbonates are the symmetrical carbonates in which both acid groups are esterified with the same unsaturated ether. These are prepared by reacting an unsaturated hydroxy ether such as allyl Cellosolve, allyl carbitol, allyl ether of trimethylene glycol, allyl-ethyl ether of glycerol, glycerol diallyl ether, allyl ether of diethylene glycol, and the corresponding vinyl, methallyl, crotyl, propargyl, cinnamyl, etc. ethers with about one-half molar equivalent of phosgene. The reaction is conducted at temperatures between 0° C. and 20° C. and in the presence of an alkaline reagent such as pyridine or other cyclic tertiary amine or an hydroxide, carbonate, or oxide of the alkaline and earth alkali metals. The phosgene is bubbled through at a rate which permits the maintenance of the temperature within the desired limits. An ice bath or other cooling means may be provided to assist in the dissipation of the heat of reaction and a stirring mechanism may be used to prevent local overheating.

Mixed polyunsaturated carbonates having two groups derived from hydroxy ethers may be prepared by reacting an unsaturated hydroxy ether with phosgene in a neutral solution to form the corresponding chloroformate. This reaction is also conducted at temperatures of 0° C. and 20° C. The chloroformate is then reacted with an equivalent quantity or a different unsaturated monohydroxy ether in the presence of an alkaline reagent such as pyridine, etc.

Other mixed polyunsaturated carbonates having only a single group derived from unsaturated hydroxy ether. The second unsaturated group of this type is derived from unsaturated alcohols described above as $R_1$ and $R_3$. These may be prepared by reacting unsaturated alcohol with the chloroformates of unsaturated hydroxy ethers or conversely, by reacting the unsaturated hydroxy ethers with chloroformates of unsaturated alcohol.

The new unsaturated carbonates are generally non-resinous compounds having distinct boiling and melting points and are often capable of separation in substantially pure state. Frequently, the impurities are side reaction products which are colorless and transparent esters having characteristics similar to the esters herein contemplated. In such cases removal of said impurities may be unnecessary where they do not produce any detrimental effect in the use to which the ester is applied. The new compounds are usually liquids at room temperature and are usually miscible with solvents such as benzene, toluene, chloroform, diethyl ether, carbon tetrachloride, and petroleum ether. The monomeric esters are valuable as plasticizers for various resinous materials such as styrene, cellulose, vinyl, urea, protein, phenolic, or acrylic resins. Other uses such as solvents, insecticides, and liquid coating compositions are noteworthy.

These esters may be polymerized in the presence of heat, light, or catalysts such as oxygen, ozone, or organic peroxides such as lauroyl, benzoyl, and acetone peroxides, to yield solid or liquid compositions of widely differing physical properties. The polymerized products vary in properties depending upon the structure of the ester and upon the degree of polymerization.

The monounsaturated esters containing but a single polymerizable unsaturated ether group and no other polymerizable group generally polymerize to a fusible or thermoplastic polymer. The polyunsaturated esters which contain at least two radicals derived from the unsaturated ether are capable of polymerization to a fusible intermediate stage and finally to a substantially infusible and/or soluble form. The completely polymerized polyunsaturated compounds are, in general, substantially unaffected by acids, alkalies, and water, and organic solvents. Intermediate polymers derived from the polyunsaturated esters having a wide range of properties may be secured by incomplete polymerization. The polymers thus obtained are transparent and colorless, although they may at times have a slightly yellow cast, especially when polymerized completely.

Upon the initial polymerization of the polyunsaturated esters in liquid monomeric state or in a solution of the monomeric state or in a solution of the monomer in suitable solvents, an increase in the viscosity of the liquids is noticeable due to the formation of a relatively low molecular weight polymer which is soluble in the monomer and in solvents such as acetone, benzene, xylene, dioxane, toluene, or carbon tetrachloride. Upon further polymerization, the liquid sets up to form a soft gel containing a substantial portion of a polymer which is insoluble in the monomer and organic solvents and containing as well, a substantial portion of a soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers of the polyunsaturated esters may be cast polymerized directly to the substantially insoluble, infusible state. This procedure is subject to certain inherent difficulties due to the strains which are established during polymerization of the gel and which frequently result in fractures as the final hard form is attained. It has been discovered that these difficulties may be avoided by releasing the strains established in the gel before the fracturing can occur. This may be done by permitting the strains to be relieved before the polymerization is complete, either periodically or by conducting the polymerization under conditions which permit gradual release of these strains. For example, the polymerization may be conducted in a simple mold until a soft firm gel has formed. At this point the polymer may be freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the complete decomposition of the peroxide catalyst. The temperature is dependent upon the catalyst used. For benzoyl peroxide, temperatures of 65 to 80° C. are suitable, while for acetone peroxide, temperatures of 140–150° C. may be used. In accordance with one modification, the gel, after it is freed from the mold, may be coated on both sides with monomer or the syrupy polymer. The coated article is then polymerized between smooth heated plates to the final insoluble state.

Cast polymers may also be prepared by a single step polymerization directly to the insoluble infusible state. The monomer may be mixed with up to five percent of benzoyl or other organic peroxide and heated at 50–60° C. until it becomes partly polymerized and thickened to an increased viscosity of 100 to 1000 percent of the monomer viscosity. The thickened monomer may then be polymerized between glass, metal, or similar plates which are separated by compressible gaskets or retainers of Koroseal (a plasticized polyvinylchloride), butadiene polymers, polyvinyl alcohol, Thiokol (a polyalkylene sulfide), rubber, or similar materials arranged about the edge of such plates. The thickened monomer may be poured on one glass plate within the confines of the flexible retainer, laid about 2 inches from the edge of the plate. The second glass plate may then be carefully laid on top, taking care to avoid the trapping of air bubbles under the top plate. When the top plate is in position, both plates may be held together by means of suitable clamps which are capable of applying pressure upon the plates directly over the flexible retainer. The entire assembly is then placed in an oven and heated at 70 to 100° C. where the polymerization is continued. During the polymerization the resin shrinks and tends to draw away from the glass surface. To prevent fractures pressures is maintained upon the plates to depress the flexible container and permit the plates to remain in contact with the polymerizing resin. This pressure may be maintained by periodically tightening the clamps or by use of spring clamps which maintains a uniform pressure throughout the polymerizing process.

By an alternative procedure for cast polymerizing sheets, the molds may be assembled before the thickened monomer is poured. Thus, the flexible compressible retainer may be inserted between the plates and held in place by suitable clamps located around the edge of the plates. This retainer or gasket is placed adjacent the edge of the plates and a suitable opening may be provided between the ends of the flexible retainer, preferably at one corner of the mold. The assembled mold is then placed in a vertical position with the open corner uppermost. The thickened monomer usually containing one to four percent residual peroxide is then poured in slowly until the entire mold is filled. After standing until all of the entrapped air has separated the mold is heated uniformly between 50 and 100° C. to continue the polymerization. Pressure is maintained upon the plates to insure the contact of glass and resin during polymerization by suitable means such as by tightening the clamps periodically or by maintaining a uniform pressure upon the plates throughout by means of spring clamps. When the resin has been completely polymerized it is separated from the glass plates and a hard, transparent, colorless, and durable resin sheet is obtained.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, by removal from exposure to ultraviolet light, by adding inhibiting materials such as pyrogallol, hydroquinone, aniline, phenylene diamene, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents such as acetone, dioxane, ether, benzene, xylene, petroleum ether, etc. Preferably, the polymers of the new esters are produced by heating the monomer or a solution thereof in the presence of substantial quantities, for example, up to 5 percent of benzoyl peroxide until the viscosity of the solution has increased about 100 to 500 percent. This may required from several hours while heating at 65° C. to 85° C. in the presence of benzoyl peroxide. The resulting viscous solution is poured into an equal volume of water, methyl or ethyl alcohol, glycol, or other nonsolvent for the fusible polymer. A polymer, usually in the form of a powder or a gummy precipitate is thus formed which may be decanted or filtered and then dried. This permits substantially complete separation of a soluble fusible polymer from unpolymerized monomer.

Often, however, a complete separation of monomer and polymer is not desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain polymer and from about 5 percent to 50 or 60 percent monomer. Preferably, the production of these materials is conducted by treatment of a solution of the monomer in a solvent for monomer and polymer, such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be treated as above described to separate the fusible polymer from the solvent. These polymers may be used as molding or coating compositions. Due to their solubility, they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohols, polyallyl alcohols, etc., and then polymerizing to the point where the gel precipitates. This polymer may be separated and used as molding powder.

The solid forms of the fusible polymers may be used as molding compositions to form desirable molded products which may be polymerized to a harder state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of benzoyl peroxide, generally in a heated mold. The polymers may be mixed with fillers such as alpha cellulose, wood pulp, and other fibrous substances, mineral fillers or pigments such as zinc oxide, calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids, or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents, and used as coating and impregnating compositions. For example, the solution or dispersion of fusible polymer in monomer or other organic solvent such as benzene, toluene, chloroform, acetone, dioxane, carbon tetrachloride, phenyl Cellosolve, dichlorethyl ether, dibutyl phthalate, or mixtures thereof, is useful as a liquid coating composition. Objects of paper, metal, cloth, wood, leather, or synthetic resins may be coated with the solution of polymer in solvent and subsequently polymerized to yield attractively finished coatings. Similarly, porous objects of felt, cloth, leather, paper, etc., either in single layers or laminated, may be impregnated with the dissolved fusible polymer and subjected to the polymerization to the final insoluble infusible state. Other molding powders may be prepared from the new esters without first converting them to the intermediate polymer. The monomer may be mixed directly with a suitable filler such as magnesium carbonate, cellulose pulp, asbestos, etc., in a ball mill or other mixing device. By proper selection of proportions, a dry pulverulent powder can be obtained which is capable of polymerization under the influence of heat and pressure to a glossy solid polymer of high tensile strength. The use of too much filler will cause a non-glossy finish and the use of too much monomer will make the powder moist and difficult to handle. Sometimes it may be desirable to precure the molding powder by subjecting it to a moderate temperature of 50 to 70° C. for a limited period of time, for example, one to three hours. This precuring operation is a partial polymerization and permits a drying molding powder where the same proportions of monomer might result in a moist molding composition.

The following examples are illustrative:

*Example I*

Approximately two moles (203 grams) of allyl cellosolve and 2.4 moles of pyridine were placed in a two-liter flask and submerged in a bath of cracked ice. While the mixture was being stirred, 0.91 mole of phosgene were bubbled through the liquid at a rate of 18 millimoles per minute. During the reaction the temperature remained below 14° C. at all times. The reaction mixture was washed with saturated salt solution and the washed solution was extracted with ether. The ether extract was combined with the ester and washed with dilute hydrochloric acid, sodium hydroxide, and with saturated salt solution. The ether solution was dried over anhydrous sodium sulfate and distilled in vacuo (133 to 140° C.) at 4 mm. total pressure. The bis(beta-allyloxyethyl) carbonate is a colorless liquid of low viscosity which has an index of refraction $$n_D^{24} = 1.4550$$

and a density $$d_{15}^{25} = 1.055$$

A ten-gram sample of the ester was mixed with 2 percent acetone peroxide and heated at 140° C. for 5 hours. A colorless polymer was formed.

*Example II*

A mixture of one mole of allyl cellosolve, 1.2 moles pyridine and 500 cc. benzene was cooled on an ice bath. While stirring vigorously, 1.1 moles of allyl chloroformate were added slowly at a rate which maintained the temperature of the reaction mass between +2° C. and +9° C. The mass was stirred for an hour after the reactants were completely combined. The reaction products were washed with water, hydrochloric acid, again with water, and dried over anhydrous calcium chloride. The allyl β-allyloxyethyl carbonate was purified by distillation (129–133° C. at 29 mm.). The new ester is a colorless mobile liquid having an index of refraction $$n_D^{25} = 1.4382$$

a density $$d_4^{25} = 1.035$$

and the following structure:

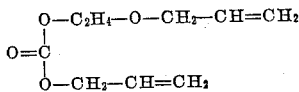

*Example III*

A quantity of 115 grams of the methallyl ether of ethylene glycol was treated with about 1.2 moles of phosgene by bubbling the gas through the ether alcohol at temperatures between 0° C. and 12° C. maintained by means of an ice bath. Localized heating was avoided by rapid stirring. The chloroformate of methallyl Cellosolve was washed with 10% sodium carbonate, with dilute hydrochloric acid and with water. The chloroformate was dried over anhydrous sodium sulphate and distilled at 10 mm. pressure. 500 cc. of benzene was added and the mixture cooled to 0° C. A mixture of 35 grams of methyl alcohol and 60 cc. of 50% sodium hydroxide was prepared and added at the rate of about 2 grams per minute while stirring vigorously. The temperature remained between +5 and +13° C. during the reaction. The benzene solution of the ester was washed with dilute HCl until neutral to phenolphthalein and then with water. After drying the ester over anhydrous sodium sulphate, the benzene was removed by evaporation under reduced pressure. The following ester, a high boiling colorless liquid, was thereby produced:

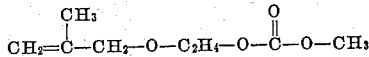

A five-gram sample was heated at 135° C. in the presence of 3 percent acetone peroxide. A soft polymer was formed.

*Example IV*

Approximately two moles (300 grams) of allyl carbitol (the monoallyl ether of diethylene glycol) was mixed with 1500 cc. benzene and 200 grams of pyridine (20 percent excess). The mixture was cooled to +2° C. on an ice bath. While continuously stirring approximately one mole of phosgene was run in at a rate slow enough to avoid raising the temperature of the reaction mass above 10° C. The reaction mixture was acidified with HCl until neutral, washed with water and dried over anhydrous calcium chloride. The benzene solution was heated at 30 to 40 mm. until the benzene was evaporated. The ester is a high boiling liquid believed to have the structure:

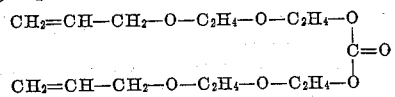

A ten gram sample was heated to 135° C. in the presence of 4 percent acetone peroxide for 16 hours. A solid polymer was produced.

*Example V*

One mole (146 grams) of allyl carbitol was treated with an excess of phosgene at temperatures between 0° C. and 10° C. maintained with a bath of an ice-salt mixture. The mixture was stirred thoroughly during the reaction. At the conclusion of the chemical reaction the pressure on the mixture was reduced to 100 mm. for two to three minutes to remove the excess phosgene. The resulting chloroformate ester was washed with saturated salt solution and dried over anhydrous sodium sulfate. The benzene solution was added slowly to a cooled mixture of 100 grams of allyl Cellosolve and 85 grams of pyridine at a rate which permitted the complete removal of the heat of reaction. The mixture was agitated during the reaction and cooled on an ice bath. The benzene solution was washed with dilute hydrochloric acid and with saturated salt solution. By heating at 125 mm. the benzene was evaporated. The resulting ester was a clear liquid and was believed to have the structure:

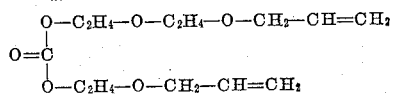

*Example VI*

Fifty grams of the carbonate of allyl alcohol and allyl carbitol was mixed with 50 cc. of benzene and 5 grams benzoyl peroxide. It was heated at 70° C. for six hours. A marked increase in the viscosity was noticed. The viscous solution was then poured into 500 cc. of methyl alcohol.

A light colored precipitate was formed which was decanted and washed with water. A soft plastic polymer was recovered.

A ten-gram sample was mixed with .4 grams benzoyl peroxide and pressed in a mold at 135°C. and 200 pounds per square inch. A transparent solid polymer was thereby prepared.

*Example VII*

A 45 gram sample of vinyl cellosolve was mixed with 50 grams of pyridine and 100 cc. benzene. Phosgene was bubbled through the mixture at the rate of 15 to 20 millemoles per minute for twenty minutes. The reaction mixture was stirred vigorously and the temperature maintained between +2 and +9° C. by means of an ice bath. The solution was washed with dilute hydrochloric acid and with water until neutral. The benzene was evaporated leaving an ester having the structure:

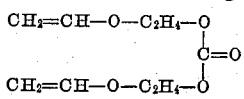

A small sample was heated with 3 percent acetone peroxide at 130° C. After ten hours a soft gel was obtained.

Although the present invention has been described with particular reference to the specific details of certain embodiments thereof, it is not intended that such details shall be regarded as limitations upon the scope of the invention, except insofar as included in the accompanying claims. I claim:

1. Bis (2-allyloxyethyl) carbonate.
2. The neutral carbonate of ethylene glycol monoallyl ether and diethylene glycol monoallyl ether.
3. The bis diethylene glycol monoallyl ether ester of carbonic acid.
4. A polymer of bis (2-allyloxyethyl) carbonate.
5. A polymer of the compound defined by claim 2.
6. A polymer of the compound defined by claim 3.
7. A neutral ester of (a) carbonic acid and (b) a monohydroxy ether of a saturated polyhydroxy alcohol and a monounsaturated monohydric alcohol having the unsaturated linkage between 2 carbon atoms in an aliphatic straight chain.
8. A neutral ester of (A) carbonic acid and (B) a monohydroxy ether of (a) a saturated polyhydroxy alcohol and (b) a mono-unsaturated monohydric alcohol containing the unsaturated linkage between two carbon atoms in an aliphatic chain and up to 5 carbon atoms.
9. A polymer of a neutral ester of (A) carbonic acid and (B) a monohydroxy ether of (a) a saturated polyhydroxy alcohol and (b) a mono-unsaturated monohydric alcohol containing the unsaturated linkage between two carbon atoms in an aliphatic chain and up to 5 carbon atoms.
10. A polymer of a neutral ester of (a) carbonic acid and (b) a monohydroxy ether of a saturated polyhydroxy alcohol and a mono-unsaturated monohydric alcohol having the unsaturated linkage between two carbon atoms in an aliphatic straight chain.
11. A compound corresponding to the structural formula:

$$R_1-O-R_2-O-\overset{O}{\underset{\|}{C}}-O-R_3-O-R_4$$

wherein the radicals $R_1$ and $R_4$ are each selected from the class consisting of radicals corresponding to the radical R in the alcohol having the formula ROH, said alcohol being an unsaturated, monohydric alcohol having from 2 to 10 carbon atoms and having an unsaturated carbon to carbon linkage in an aliphatic straight chain, the unsaturated linkage being adjacent the beta carbon atom of the alcohol, and $R_2$ and $R_3$ are radicals selected from the group consisting of divalent saturated aliphatic hydrocarbon radicals and divalent radicals of the formula $-R_5-(O-R_5)_n-$, in which $R_5$ is an alkylene radical and $n$ is a small whole number.
12. A polymer of the compound defined in claim 11.

MAXWELL AARON POLLACK.